(12) United States Patent
Hou et al.

(10) Patent No.: US 9,063,339 B2
(45) Date of Patent: Jun. 23, 2015

(54) STEREOSCOPIC DISPLAY SYSTEM AND DRIVING METHOD THEREOF

(75) Inventors: Hung-Lung Hou, Shenzhen (CN); Cheng-Ming He, Shenzhen (CN)

(73) Assignee: SHENZHEN CHINA STAR OPTOELECTRONICS TECHNOLOGY CO., LTD., Shenzhen, Guangdong Province (CN)

( * ) Notice: Subject to any disclaimer, the term of this patent is extended or adjusted under 35 U.S.C. 154(b) by 696 days.

(21) Appl. No.: 13/380,905

(22) PCT Filed: Dec. 5, 2011

(86) PCT No.: PCT/CN2011/083447
§ 371 (c)(1),
(2), (4) Date: Dec. 27, 2011

(87) PCT Pub. No.: WO2013/075365
PCT Pub. Date: May 30, 2013

(65) Prior Publication Data
US 2013/0135289 A1    May 30, 2013

(30) Foreign Application Priority Data

Nov. 24, 2011 (CN) .......................... 2011 1 0378987

(51) Int. Cl.
*G02B 27/22* (2006.01)
*H04N 13/04* (2006.01)
*G02B 5/04* (2006.01)

(52) U.S. Cl.
CPC ........ *G02B 27/2264* (2013.01); *H04N 13/0438* (2013.01); *G02B 5/045* (2013.01)

(58) Field of Classification Search
CPC . G09G 3/003; G09G 3/3406; H04N 13/0438; H04N 13/0497
USPC .................................... 345/6, 419, 212, 690
See application file for complete search history.

(56) References Cited

U.S. PATENT DOCUMENTS

2004/0239580 A1* 12/2004 Nagatani et al. ............... 345/1.3
2006/0222286 A1* 10/2006 Spoonhower et al. .......... 385/15

FOREIGN PATENT DOCUMENTS

| CN | 1254239 A | 5/2000 |
|---|---|---|
| CN | 101866055 A | 10/2010 |
| CN | 101916034 A | 12/2010 |
| CN | 102244793 A | 11/2011 |
| CN | 102244799 A | 11/2011 |

\* cited by examiner

*Primary Examiner* — Michael Faragalla
(74) *Attorney, Agent, or Firm* — Cheng-Ju Chiang

(57) ABSTRACT

A stereoscopic display system and a driving method thereof are disclosed. The stereoscopic display system comprises a display unit, a pair of shutter glasses and a backlight unit. The pair of shutter glasses comprises a left eyeglass and a right eyeglass for watching a left-eye signal and a right-eye signal respectively at different times. Both the left eyeglass and the right eyeglass operate synchronously with the display unit and are turned on and off alternately to watch the left-eye signal and the right-eye signal at different times. The backlight unit provides planar light rays for the display unit. The backlight unit comprises a plurality of light emitting regions which are arranged in a direction identical to a scanning direction of the display unit. The light emitting regions are turned on sequentially in the scanning direction. A turn-on time of each of the light emitting regions corresponds to a transmissivity of the pair of shutter glasses. Light emission brightness of the light emitting regions is distributed asymmetrically in the scanning direction. The stereoscopic display system and the driving method thereof of the present disclosure can reduce the crosstalk and improve the user's experience when using the stereoscopic display system.

11 Claims, 3 Drawing Sheets

STEREOSCOPIC DISPLAY SYSTEM AND DRIVING METHOD THEREOF

FIELD OF THE INVENTION

The present disclosure generally relates to the technical field of displaying, and more particularly, to a stereoscopic display system and a driving method thereof that can reduce the crosstalk.

BACKGROUND OF THE INVENTION

The basic principle of stereoscopic displaying is that, two images having differences therebetween are provided to the left eye and the right eye of a user respectively so that the two images are combined into an image with a stereoscopic effect in the user's brain.

The stereoscopic images are usually watched with naked eyes directly or by means of a pair of stereoscopic glasses. When the stereoscopic images are watched with naked eyes directly, the positions of the eyes are strictly limited. This tends to cause not only fatigue of the user, but also crosstalk of the images. Therefore, users watch the stereoscopic images by means of a pair of stereoscopic glasses in many cases. For example, a pair of shutter glasses may be used to watch images displayed by a liquid crystal display (LCD) that adopts a scanning backlight unit as a light source.

A scanning backlight unit generally comprises a plurality of light emitting regions that are turned on sequentially, and light emission brightness of the light emitting regions is distributed symmetrically from a central area of the light emitting regions towards two sides in a scanning direction with the light emission brightness being the highest in the central area. Furthermore, the light emission brightness of a light emitting region is influenced by a previous light emitting region in the scanning direction. When a pair of active shutter glasses is used to watch images displayed by an LCD panel, switching between left-eye signals and right-eye signals is made by the LCD panel in cooperation with the backlight unit. For example, when the LCD panel switches from a left-eye signal to a right-eye signal, an erroneous image displayed may be caused due to the symmetric distribution of light emission brightness between the two adjacent light emitting regions, thus causing the so-called "crosstalk" in the stereoscopic display system. The image watched by the user will become erroneous due to the crosstalk, which is undesirable for the user.

SUMMARY OF THE INVENTION

The primary objective of the present disclosure is to reduce the crosstalk in a stereoscopic display system.

To achieve the aforesaid objective, the present disclosure provides a stereoscopic display system, which comprises a display unit, a pair of shutter glasses and a backlight unit. The pair of shutter glasses comprises a left eyeglass and a right eyeglass for watching a left-eye signal and a right-eye signal respectively at different times. Both the left eyeglass and the right eyeglass operate synchronously with the display unit and are turned on and off alternately to watch the left-eye signal and the right-eye signal at different times. The backlight unit provides planar light rays for the display unit. The backlight unit comprises a plurality of light emitting regions which are arranged in a direction identical to a scanning direction of the display unit. The light emitting regions are turned on sequentially in the scanning direction. A turn-on time of each of the light emitting regions corresponds to a transmissivity of the pair of shutter glasses. Light emission brightness of the light emitting regions is distributed asymmetrically in the scanning direction. Average light emission brightness of the light emitting regions at a front side of a central area thereof is greater than average light emission brightness of the light emitting regions at a back side of the central area thereof in the scanning direction. A light exiting surface of the light emitting regions comprises an optical film. A transmissivity of the optical film at the front side of the central area of the light emitting regions is greater than a transmissivity of the optical film at the back side of the central area of the light emitting regions.

According to a preferred embodiment of the present disclosure, the pair of shutter glasses is a pair of active shutter glasses, the right eyeglass is turned off when the left eyeglass is turned on, and the left eyeglass is turned off when the right eyeglass is turned on.

According to a preferred embodiment of the present disclosure, the display unit is a liquid crystal display (LCD) panel.

To achieve the aforesaid objective, the present disclosure provides a stereoscopic display system, which comprises a display unit, a pair of shutter glasses and a backlight unit. The pair of shutter glasses comprises a left eyeglass and a right eyeglass for watching a left-eye signal and a right-eye signal respectively at different times. Both the left eyeglass and the right eyeglass operate synchronously with the display unit and are turned on and off alternately to watch the left-eye signal and the right-eye signal at different times. The backlight unit provides planar light rays for the display unit. The backlight unit comprises a plurality of light emitting regions which are arranged in a direction identical to a scanning direction of the display unit. The light emitting regions are turned on sequentially in the scanning direction. A turn-on time of each of the light emitting regions corresponds to a transmissivity of the pair of shutter glasses. Light emission brightness of the light emitting regions is distributed asymmetrically in the scanning direction.

According to a preferred embodiment of the present disclosure, average light emission brightness of the light emitting regions at a front side of a central area thereof is greater than average light emission brightness of the light emitting regions at a back side of the central area thereof in the scanning direction.

According to a preferred embodiment of the present disclosure, light emission brightness in the central area of the light emitting regions decreases in a step-like manner from the central area to the front side.

According to a preferred embodiment of the present disclosure, a light exiting surface of the light emitting regions comprises an optical film, and a transmissivity of the optical film at the front side of the central area of the light emitting regions is greater than a transmissivity of the optical film at the back side of the central area of the light emitting regions.

According to a preferred embodiment of the present disclosure, a light exiting surface of the light emitting regions comprises a plurality of optical films, and transmissivities of the optical films at the front side of the central area of the light emitting regions are greater than transmissivities of the optical films at the back side of the central area of the light emitting regions.

According to a preferred embodiment of the present disclosure, a light exiting surface of the light emitting regions comprises a plurality of prism structures, and apex angles of the prism structures at the front side of the central area of the light emitting regions are greater than apex angles of the prism structures at the back side of the central area of the light emitting regions.

According to a preferred embodiment of the present disclosure, the pair of shutter glasses is a pair of active shutter glasses, the right eyeglass is turned off when the left eyeglass is turned on, and the left eyeglass is turned off when the right eyeglass is turned on.

According to a preferred embodiment of the present disclosure, the display unit is an LCD panel.

To achieve the aforesaid objective, the present disclosure further provides a driving method of a stereoscopic display system, which comprises the following steps of:

enabling a left eyeglass and a right eyeglass of a pair of shutter glasses for watching a left-eye signal and a right-eye signal respectively at different times to operate synchronously with a display unit and to be turned on and off alternately; and enabling a plurality of light emitting regions of a backlight unit, which are arranged in a direction identical to a scanning direction of the display unit, to be turned on sequentially in the scanning direction, and enabling a turn-on time of each of the light emitting regions to correspond to a transmissivity of the pair of shutter glasses, with light emission brightness of the light emitting regions being distributed asymmetrically in the scanning direction.

According to a preferred embodiment of the present disclosure, average light emission brightness of the light emitting regions at a front side of a central area thereof is made greater than average light emission brightness of the light emitting regions at a back side of the central area thereof in the scanning direction.

The present disclosure has the following benefits: as compared to the prior art, erroneous images caused by brightness of the backlight unit superimposed on the displayed images of the stereoscopic display system can be remarkably reduced or even eliminated. Thereby, the crosstalk can be significantly reduced to improve the displaying quality of the stereoscopic display system and the user's experience.

BRIEF DESCRIPTION OF THE DRAWINGS

In order to more clearly describe the technical solutions of the embodiments of the present disclosure, attached drawings to be used in the detailed description of the disclosure will be briefly described hereinbelow. Obviously, the attached drawings described hereinbelow only illustrate some of the embodiments of the present disclosure, and those of ordinary skill in the art can also obtain other attached drawings therefrom without the need of making inventive efforts, wherein.

DETAILED DESCRIPTION OF THE INVENTION

Figure 1:
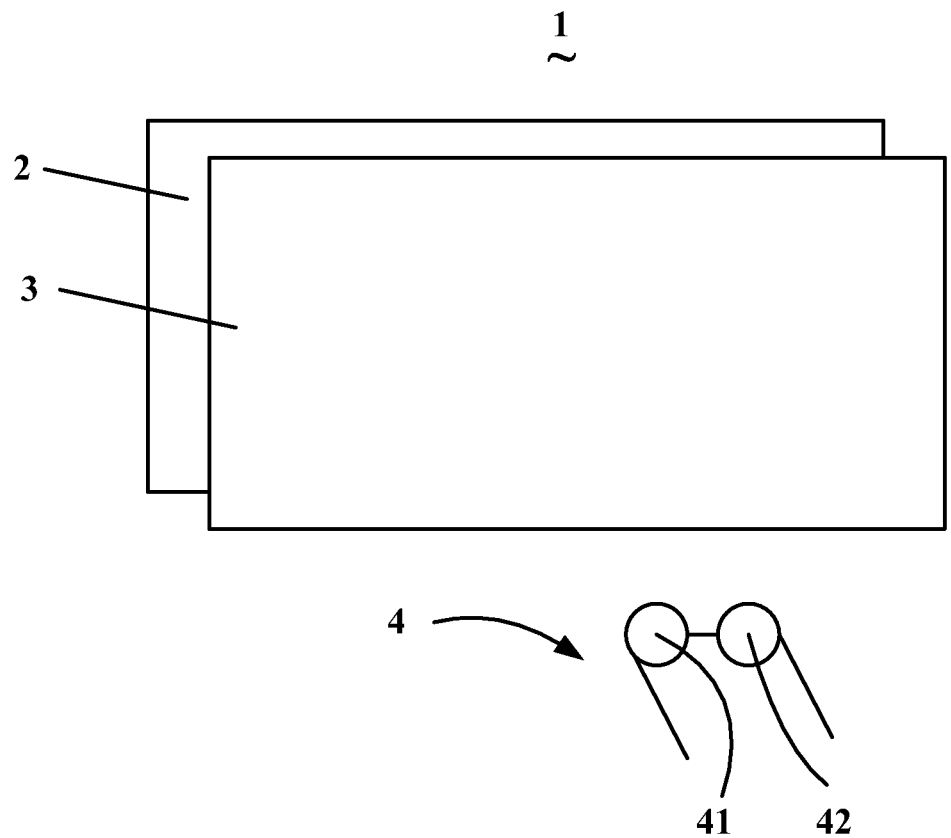
FIG. 1 is a schematic structural view of a stereoscopic display system according to an embodiment of the present disclosure.

Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Hereinbelow, the technical solutions of embodiments of the present disclosure will be described clearly and completely with reference to the attached drawings. Obviously, the embodiments described herein are only some of the embodiments of the present disclosure but do not represent all embodiments of the disclosure. All other embodiments that can be devised by those of ordinary skill in the art on the basis of the embodiments described herein and without making inventive efforts shall fall within the scope of the present disclosure.

Referring to FIG. 1, there is shown a schematic structural view of a stereoscopic display system according to an embodiment of the present disclosure. The stereoscopic display system 1 comprises a backlight unit 2, a display unit 3 and a pair of shutter glasses 4.

The backlight unit 2 emits planar light rays, and the display unit 3 is disposed in front of the backlight unit 2 and displays a left-eye signal and a right-eye signal, which have differences therebetween, at different times by using the light rays emitted by the backlight unit 2. In this embodiment, the display unit 3 may be a liquid crystal display (LCD) panel. The pair of shutter glasses 4 comprises a left eyeglass 41 and a right eyeglass 42 for watching the left-eye signal and the right-eye signal respectively at different times. Both the left eyeglass 41 and the right eyeglass 42 operate synchronously with the display unit 3 and are turned on and off alternately to watch the left-eye signal and the right-eye signal at different times. The left-eye signal and the right-eye signal displayed by the display unit 3 can be watched by a watcher using the pair of shutter glasses 4, and then be combined into an image with a stereoscopic effect in the watcher's brain.

The pair of shutter glasses 4 is a pair of active shutter glasses 4, and the left eyeglass 41 and the right eyeglass 42 are turned on and off alternately. That is, when the display unit 3 displays the left-eye signal, the left eyeglass 41 is turned on and the right eyeglass 42 is turned off; and when the display unit 3 displays the right-eye signal, the left eyeglass 41 is turned off and the right eyeglass 42 is turned on. The right eyeglass 42 will be taken as an example for illustration. The transmissivity of the right eyeglass 42 is relatively low when the right eyeglass 42 is just turned on, and increases gradually as the turn-on time goes on; and when the right eyeglass 42 is turned off, the transmissivity thereof decreases to the minimum. The transmissivity of the left eyeglass 41 varies similar to that of the right eyeglass 42.

Figure 2:
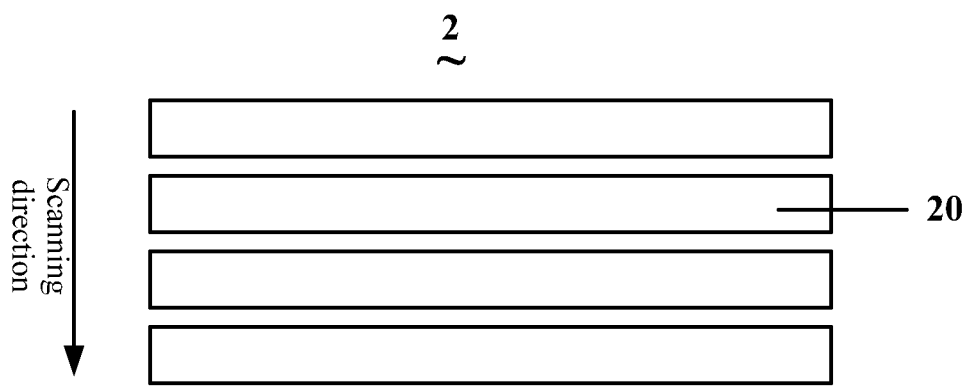
FIG. 2 is a schematic front view illustrating a structure of a backlight unit of the stereoscopic display system shown in FIG. 1.

Referring to FIG. 2 together, there is shown a schematic front view illustrating a structure of the backlight unit of the stereoscopic display system shown in FIG. 1. The backlight unit 2 is a scanning backlight unit and comprises a plurality of light emitting regions 20 which are arranged in a direction identical to a scanning direction of the display unit 3. The light emitting regions 20 are turned on sequentially in the scanning direction, e.g., from the top to the bottom of the backlight unit 2 as shown in FIG. 2. In order to achieve a better stereoscopic effect, a turn-on time of each of the light emitting regions 20 corresponds to a transmissivity of the pair of shutter glasses 4. That is, in order to avoid brightness nonuniformity of a stereoscopic image watched due to a low transmissivity of the pair of shutter glasses 4 caused when the corresponding light emitting region 20 is turned on too early, the light emitting region 20 is not turned on until each frame signal is to be ended.

Figure 3:
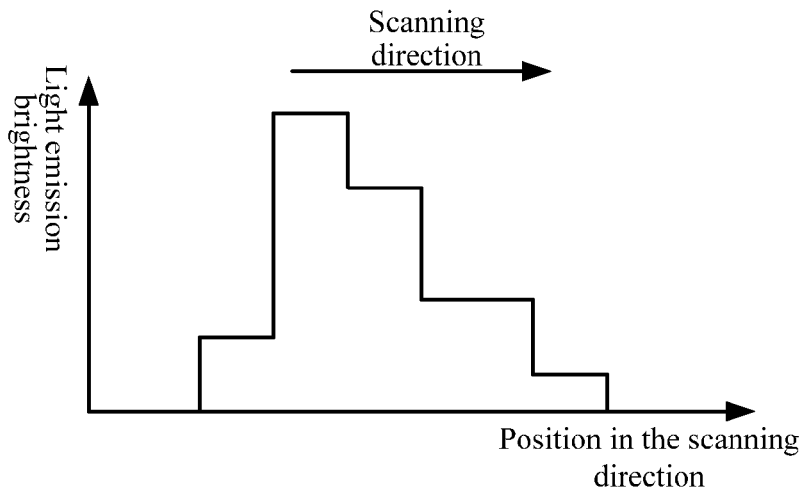
FIG. 3 is a schematic view illustrating the distribution of light emission brightness of light emitting regions of the backlight unit shown in FIG. 2.
Figure 4:
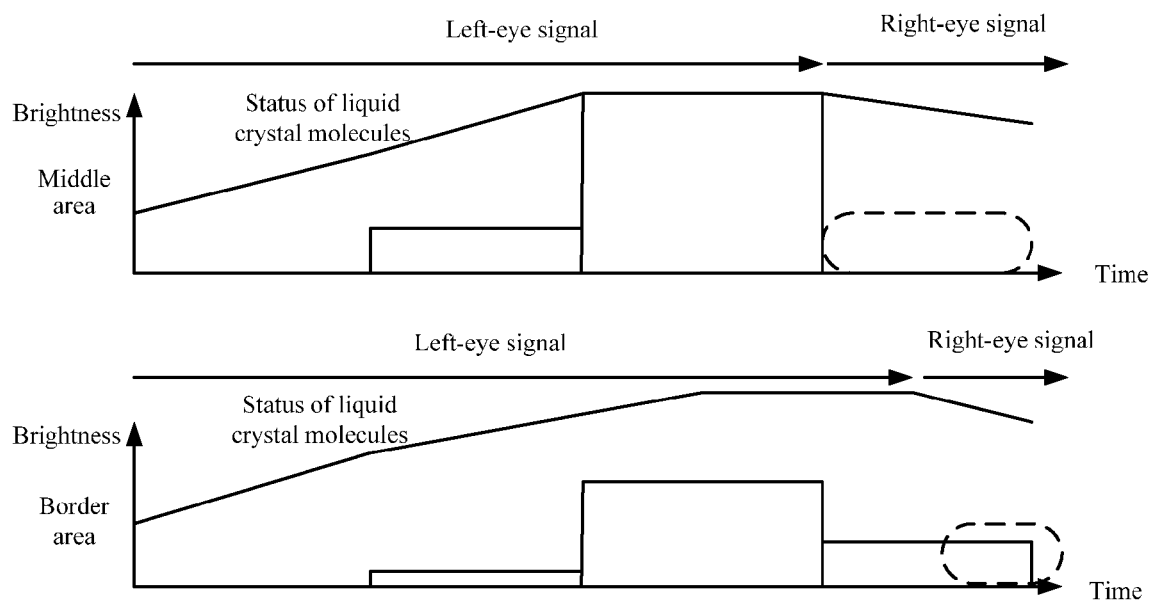
FIG. 4 illustrates graphs of brightness of a middle area and of a border area of the backlight unit shown in FIG. 2 varying with the time.

Referring to FIG. 3 and FIG. 4 together, FIG. 3 is a schematic view illustrating the distribution of light emission brightness of the light emitting regions of the backlight unit shown in FIG. 2; and FIG. 4 illustrates graphs of brightness of a middle area and of a border area of the backlight unit shown in FIG. 2 varying with time. The light emission brightness of the light emitting regions 20 is distributed asymmetrically in the scanning direction, and average light emission brightness of the light emitting regions 20 at a front side of a central area thereof is greater than average light emission brightness of the light emitting regions 20 at a back side of the central area thereof. Preferably, the light emission brightness in the central area of the light emitting regions 20 decreases in a step-like manner from the central area to the front side. As shown in FIG. 4, the brightness of the light emitting regions 20 varies with time. Within a frame signal duration, the brightness of the light emitting regions 20 varies in coordination with a status of liquid crystal molecules of the display unit 3. Specifically, when the display unit 3 switches from the left-eye signal to the right-eye signal, the brightness of the central area decreases to zero. Although a border area between adjacent ones of the light emitting regions 20 continues to emit light under the influence of the adjacent two light emitting regions 20, the light emission brightness of the border area is reduced significantly as compared to the case of the symmetric distribution of light emission brightness in the prior art. Therefore, the crosstalk can be reduced significantly during the switching from the left-eye signal to the right-eye signal.

Figure 5:
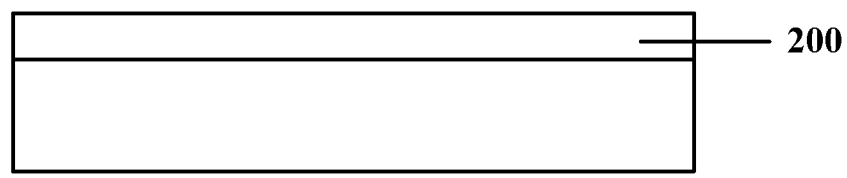
FIG. 5 is a schematic side view illustrating a structure of the backlight unit shown in FIG. 2.
Figure 6:
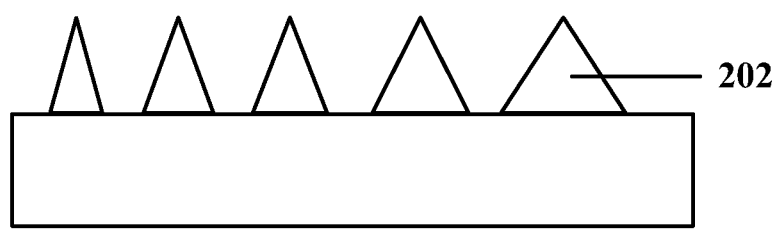
FIG. 6 is a schematic side view illustrating a structure of another embodiment of the backlight unit shown in FIG. 2.

The asymmetrical distribution of light emission brightness can be achieved by various means. As an example, referring to FIG. 5, there is shown a schematic side view illustrating a structure of the backlight unit 2 shown in FIG. 2. An optical film 200 may be disposed on a whole light exiting surface (not shown) of the light emitting regions 20; a transmissivity of the optical film 200 at the front side of the central area of the light emitting regions 20 is greater than a transmissivity of the optical film 200 at the back side of the central area of the light emitting regions 20; and in this way, the average light emission brightness of the light emitting regions 20 at the front side of the central area thereof can be made greater than the average light emission brightness of the light emitting regions 20 at the back side of the central area thereof. Alternatively, a plurality of optical films 200 may be disposed on the light exiting surface of the light emitting regions 20 or a display surface (not shown) of the display unit 3; transmissivities of the optical films 200 at the front side of the central area of the light emitting regions 20 are greater than transmissivities of the optical films 200 at the back side of the central area of the light emitting regions 20; and this can also make the average light emission brightness of the light emitting regions 20 at the front side of the central area thereof greater than the average light emission brightness of the light emitting regions 20 at the back side of the central area thereof. As another example, referring to FIG. 6, there is shown a schematic side view illustrating a structure of another embodiment of the backlight unit 2 shown in FIG. 2. A plurality of prism structures 202 are disposed on the light exiting surface of the light emitting regions 20 or the display surface of the display unit 3. The prism structures 202 are made of a transparent material. Each of the prism structures 202 comprises an apex angle away from the light exiting surface. Apex angles of the prism structures 202 at the front side of the central area of the light emitting regions 20 are greater than apex angles of the prism structures 202 at the back side of the central area of the light emitting regions 20.

As compared to the prior art, the light emitting regions 20 of the stereoscopic display system 1 according to the present disclosure are turned on sequentially, and switching between the left-eye signal and the right-eye signal is made by the display unit 3 in cooperation with the backlight unit 2. Because the light emission brightness of the light emitting regions 20 is distributed asymmetrically in the scanning direction, the brightness of the light emitting regions 20 of the backlight unit 2 is distributed asymmetrically when the display unit 3 switches from the left-eye signal to the right-eye signal. In this way, erroneous images caused by the brightness of the backlight unit 2 superimposed on the right-eye signal can be remarkably reduced or even eliminated. Thereby, the crosstalk can be significantly reduced to improve the displaying quality of the stereoscopic display system 1 and the user's experience.

A driving method of a stereoscopic display system is further disclosed in the present disclosure. The driving method comprises the following steps of:

enabling a left eyeglass and a right eyeglass of a pair of shutter glasses for watching a left-eye signal and a right-eye signal respectively at different times to operate synchronously with a display unit and to be turned on and off alternately; and enabling a plurality of light emitting regions of a backlight unit, which are arranged in a direction identical to a scanning direction of the display unit, to be turned on sequentially in the scanning direction, and enabling a turn-on time of each of the light emitting regions to correspond to a transmissivity of the pair of shutter glasses, with light emission brightness of the light emitting regions being distributed asymmetrically in the scanning direction.

The driving method of the present disclosure can be understood with reference to the stereoscopic display system 1, and thus will not be further described herein.

In the aforesaid driving method, average light emission brightness of the light emitting regions at a front side of a central area thereof is greater than average light emission brightness of the light emitting regions at a back side of the central area thereof in the scanning direction. In order to achieve this distribution effect of the light emission brightness, for example, an optical film may be disposed on the light exiting surface of the light emitting regions or the display surface of the display unit, and a transmissivity of the optical film at the front side of the central area of the light emitting regions is greater than a transmissivity of the optical film at the back side of the central area of the light emitting regions; a plurality of optical films may be disposed on the light exiting surface of the light emitting regions or the display surface of the display unit, and transmissivities of the optical films at the front side of the central area of the light emitting regions are greater than transmissivities of the optical films at the back side of the central area of the light emitting regions; or a plurality of prism structures may also be disposed on the light exiting surface of the light emitting regions or the display surface of the display unit, and apex angles of the prism structures at the front side of the central area of the light emitting regions are greater than apex angles of the prism structures at the back side of the central area of the light emitting regions.

According to the above descriptions, the stereoscopic display system and the driving method thereof of the present disclosure can reduce the crosstalk and improve the user's experience when using the stereoscopic display system.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A stereoscopic display system, comprising a display unit, a pair of shutter glasses and a backlight unit, the pair of shutter glasses comprising a left eyeglass and a right eyeglass for watching a left-eye signal and a right-eye signal respectively at different times, both the left eyeglass and the right eyeglass operating synchronously with the display unit and being turned on and off alternately to watch the left-eye signal and the right-eye signal at different times, and the backlight unit providing planar light rays for the display unit, the pair of shutter glasses being a pair of active shutter glasses, the right eyeglass being turned off when the left eyeglass being turned on, and the left eyeglass being turned off when the right eyeglass being turned on; wherein the backlight unit comprises a plurality of light emitting regions which are arranged in a direction identical to a scanning direction of the display unit, the light emitting regions are turned on sequentially in the scanning direction, a turn-on time of each of the light emitting regions corresponds to a transmissivity of the pair of shutter glasses, light emission brightness of the light emitting regions is distributed asymmetrically in the scanning direction, average light emission brightness of the light emitting regions at a front side of a central area thereof is greater than average light emission brightness of the light emitting regions at a back side of the central area thereof in the scanning direction, a light exiting surface of the light emitting regions comprises an optical film, and a transmissivity of the optical film at the front side of the central area of the light emitting regions is greater than a transmissivity of the optical film at the back side of the central area of the light emitting regions.

2. The stereoscopic display system of claim 1, wherein the display unit is a liquid crystal display (LCD) panel.

3. A stereoscopic display system, comprising a display unit, a pair of shutter glasses and a backlight unit, the pair of shutter glasses comprising a left eyeglass and a right eyeglass for watching a left-eye signal and a right-eye signal respectively at different times, both the left eyeglass and the right eyeglass operating synchronously with the display unit and being turned on and off alternately to watch the left-eye signal and the right-eye signal at different times, and the backlight unit providing planar light rays for the display unit, the pair of shutter glasses being a pair of active shutter glasses, the right eyeglass being turned off when the left eyeglass being turned on, and the left eyeglass being turned off when the right eyeglass being turned on; wherein the backlight unit comprises a plurality of light emitting regions which are arranged in a direction identical to a scanning direction of the display unit, the light emitting regions are turned on sequentially in the scanning direction, a turn-on time of each of the light emitting regions corresponds to a transmissivity of the pair of shutter glasses, and light emission brightness of the light emitting regions is distributed asymmetrically in the scanning direction.

4. The stereoscopic display system of claim 3, wherein average light emission brightness of the light emitting regions at a front side of a central area thereof is greater than average light emission brightness of the light emitting regions at a back side of the central area thereof in the scanning direction.

5. The stereoscopic display system of claim 4, wherein light emission brightness in the central area of the light emitting regions decreases in a step-like manner from the central area to the front side.

6. The stereoscopic display system of claim 4, wherein a light exiting surface of the light emitting regions comprises an optical film, and a transmissivity of the optical film at the front side of the central area of the light emitting regions is greater than a transmissivity of the optical film at the back side of the central area of the light emitting regions.

7. The stereoscopic display system of claim 4, wherein a light exiting surface of the light emitting regions comprises a plurality of optical films, and transmissivities of the optical films at the front side of the central area of the light emitting regions are greater than transmissivities of the optical films at the back side of the central area of the light emitting regions.

8. The stereoscopic display system of claim 4, wherein a light exiting surface of the light emitting regions comprises a plurality of prism structures, and apex angles of the prism structures at the front side of the central area of the light emitting regions are greater than apex angles of the prism structures at the back side of the central area of the light emitting regions.

9. The stereoscopic display system of claim 3, wherein the display unit is an LCD (liquid crystal display) panel.

10. A driving method of a stereoscopic display system, comprising the following steps of:
    enabling a left eyeglass and a right eyeglass of a pair of shutter glasses for watching a left-eye signal and a right-eye signal respectively at different times to operate synchronously with a display unit and to be turned on and off alternately, wherein the pair of shutter glasses is a pair of active shutter glasses, the right eyeglass is turned off when the left eyeglass is turned on, and the left eyeglass is turned off when the right eyeglass is turned on; and
    enabling a plurality of light emitting regions of a backlight unit, which are arranged in a direction identical to a scanning direction of the display unit, to be turned on sequentially in the scanning direction, and enabling a turn-on time of each of the light emitting regions to correspond to a transmissivity of the pair of shutter glasses, with light emission brightness of the light emitting regions being distributed asymmetrically in the scanning direction.

11. The driving method of claim 10, wherein average light emission brightness of the light emitting regions at a front side of a central area thereof is made greater than average light emission brightness of the light emitting regions at a back side of the central area thereof in the scanning direction.

* * * * *